United States Patent
Bui et al.

(10) Patent No.: US 8,405,926 B2
(45) Date of Patent: Mar. 26, 2013

(54) TAPE DRIVE VELOCITY CONTROL

(75) Inventors: Nhan Xuan Bui, Tucson, AZ (US); Reed Alan Hancock, Tuscon, AZ (US); Randy Clark Inch, Tucson, AZ (US); Shuhei Nadehara, Tokyo (JP); Eiji Ogura, Kanagawa-ken (JP); Kazuhiro Tsuruta, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 12/842,938

(22) Filed: Jul. 23, 2010

(65) Prior Publication Data

US 2012/0019953 A1 Jan. 26, 2012

(51) Int. Cl.
*G11B 15/52* (2006.01)
*G11B 15/46* (2006.01)

(52) U.S. Cl. .................. 360/73.11; 360/73.04; 360/72.2; 360/72.3

(58) Field of Classification Search .................. None
See application file for complete search history.

(56) References Cited

U.S. PATENT DOCUMENTS

| | | |
|---|---|---|
| 4,774,603 A | 9/1988 | Dong et al. |
| 5,998,946 A | 12/1999 | Kim |
| 6,754,026 B1 | 6/2004 | Koski |
| 6,768,281 B2 | 7/2004 | Koski |
| 6,791,781 B2 | 9/2004 | Bui et al. |
| 6,836,386 B2 | 12/2004 | Koski |
| 2004/0046515 A1 | 3/2004 | Koski |
| 2004/0051991 A1 | 3/2004 | Koski |
| 2008/0198495 A1 | 8/2008 | Nayak et al. |
| 2009/0206190 A1* | 8/2009 | Bui et al. .................. 242/390.9 |

FOREIGN PATENT DOCUMENTS

| | | |
|---|---|---|
| EP | 0 261 342 B1 | 5/1992 |
| EP | 0 854 479 A1 | 7/1998 |
| JP | 2003 2087 41 A2 | 7/2003 |

OTHER PUBLICATIONS

K.Teshirogi, Y.Ota, K.Sumida and M.Simzu; 'Tape Speed Servo Control'; IEEE Translation Journal on Magnetics in Japan; vol. 9, No. 3, May/Jun. 1994, pp. 30-37.
International Search Report and Written Opinion from PCT Application No. PCT/EP2011/062087 dated Nov. 18, 2011.

* cited by examiner

*Primary Examiner* — Andrew L Sniezek (57) ABSTRACT

In accordance with the present invention, a method of operating a magnetic tape drive, a magnetic tape drive and a servo control system are provided for obtaining and maintaining velocity control in a magnetic tape drive. In one embodiment, a method is provided for operating a magnetic tape drive. The tape drive includes a plurality of DC motors, and each DC motor has a plurality of Hall sensors. The DC motors are under the control of a servo system which is configured to read location information from the magnetic tape, and compute a primary tape velocity from the location information, and sense a secondary and tertiary velocity signal and compute a tape velocity based on one of the sensed secondary velocity signal and tertiary velocity. The method includes detecting if the primary velocity location information is available. In response to detecting that the primary velocity location information is available the primary velocity is employed to control the servo system. In response to detecting the primary velocity location information is unavailable then one of a secondary or a tertiary velocity signal is employed. The secondary velocity signal is employed when an absolute value of a term related to tape velocity is less than a predetermined value. The tertiary velocity signal is employed when the absolute value of the term related to tape velocity is greater than the predetermined value.

15 Claims, 4 Drawing Sheets

TAPE DRIVE VELOCITY CONTROL

DOCUMENTS INCORPORATED BY REFERENCE

Commonly assigned U.S. Pat. No. 6,754,026 is incorporated for its showing of computing a reel radius in a tape drive and a servo control system that obtains tape velocity from a secondary velocity based on back EMF voltage derived from the Pulse Width Modulated (PWM) signals.

Commonly assigned U.S. Pat. No. 6,836,386 is incorporated for its showing of a servo control system that obtains tape velocity from a secondary velocity based on back EMF voltage derived from the Pulse Width Modulated (PWM) signals with calibration.

TECHNICAL FIELD

This invention relates to tape drives, and, more particularly, to tape drives which employ DC motors, wherein the tape drive DC motors are arranged to longitudinally move a tape mounted on tape reels rotated by the DC motors under the control of a servo system.

BACKGROUND

Tape, such as magnetic tape, provides a means for physically storing data which may be archived or which may be stored in storage shelves of automated data storage libraries, and accessed when required. As an archival medium, tape often comprises the only copy of the data, such that the data must be written accurately and the tape must be handled with care to prevent damage.

Tape drives frequently employ DC motors and a servo system for operating the DC motors, to produce well controlled motion parameters such as position, velocity and tape tension. Precise control of tape velocity is required in order to correctly read and/or write data to the tape.

SUMMARY OF THE INVENTION

In accordance with the present invention, a method of operating a magnetic tape drive, a magnetic tape drive and a servo control system are provided for obtaining and maintaining velocity control in a magnetic tape drive. In one embodiment, a method is provided for operating a magnetic tape drive. The tape drive includes a plurality of DC motors, and each DC motor has a plurality of Hall sensors. The DC motors each arranged to longitudinally move a magnetic tape mounted on tape reels rotated by the DC motors under the control of a servo system. The servo system is configured to read location information from the magnetic tape, and compute a primary tape velocity from the location information, sense a secondary velocity signal and a tertiary velocity signal and compute a tape velocity based on one of the sensed secondary velocity signal and tertiary velocity signal. The method includes detecting if the primary velocity location information is available. In response to detecting that the primary velocity location information is available the primary velocity is employed to control the servo system. In response to detecting the primary velocity location information is unavailable then one of a secondary or a tertiary velocity signal is employed. The secondary velocity signal is employed when an absolute value of a term related to tape velocity is less than a predetermined value. The tertiary velocity signal is employed when the absolute value of the term related to tape velocity is greater than the predetermined value.

In one embodiment the primary velocity location information includes a formatted servo track on the magnetic tape. In one embodiment the secondary and the tertiary velocity signals are measured from at least one of the DC motors and the predetermined value of the term related to tape velocity is directly related to a rotational velocity of at least one DC motor. Further, in one embodiment the secondary velocity signal employs a back-EMF voltage of at least one DC motor of the magnetic tape drive. Still further, in one embodiment at least one DC motor further comprises Hall sensors and the tertiary velocity signal employs the Hall sensor signals.

In one embodiment the term related to tape velocity includes a rotational velocity of the DC motor that is rotating at a slowest rate. Further, in one embodiment the secondary velocity signal is employed when the DC motors are beginning from rest.

For a fuller understanding of the present invention, reference should be made to the following detailed description taken in conjunction with the accompanying drawings.

DETAILED DESCRIPTION OF THE PREFERRED EMBODIMENT

This invention is described in preferred embodiments in the following description with reference to the Figures, in which like numbers represent the same or similar elements. While this invention is descried in terms of the best mode for achieving this invention's objectives, it will be appreciated by those skilled in the art that variations may be accomplished in view of these teachings and without deviating from the spirit or scope of the invention.

Tape drives frequently employ DC motors and a servo system for operating the DC motors, to produce well controlled motion parameters such as position, velocity and tape tension. In one embodiment a measured tape velocity is compared to a reference tape velocity to determine a velocity error. The velocity error is employed in servo logic to generate a motor torque signal for each DC motor. Precise control of tape velocity is required in order to correctly read and/or write data to the tape.

Figure 1:
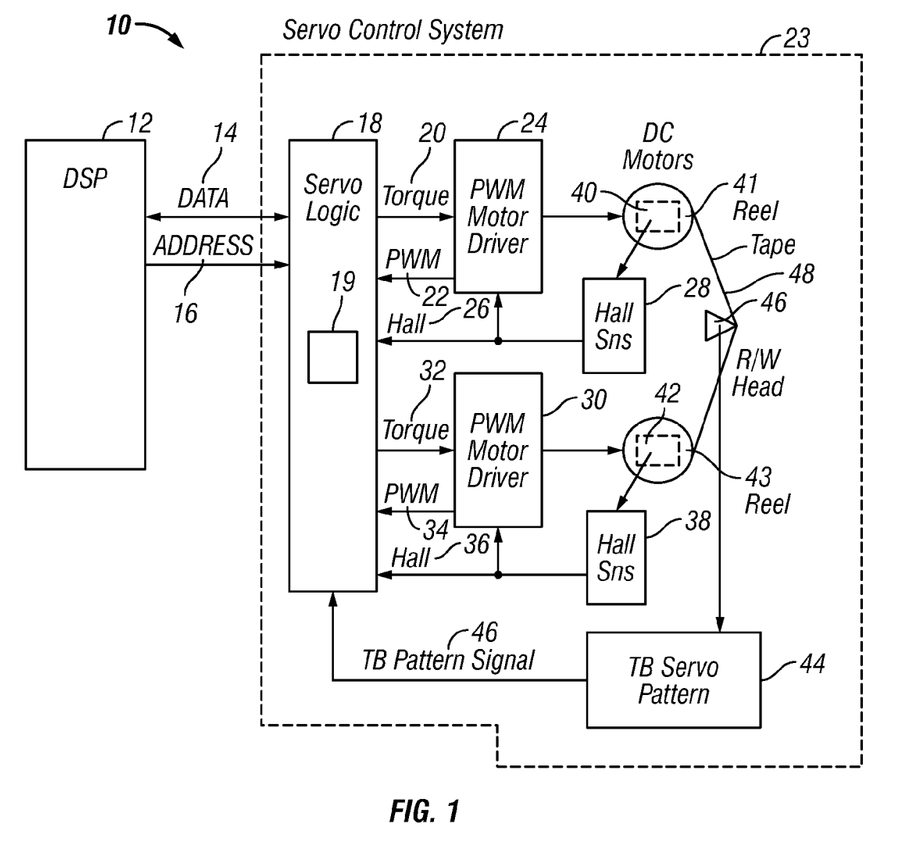
FIG. 1 is a block diagram illustration of a tape drive which implements the present invention.

With reference now to the figures and in particular with reference to FIG. 1 a tape drive is shown. The tape drive 10 has a digital signal processor or microprocessor (DSP) 12. DSP communicates data 14 between and directs addresses 16 to a servo control system 23. The DSP 12 communicates directly with the servo logic system 18 of the servo control system 23. The servo logic system 18 includes a counter 19. The servo logic system 18 also includes timers, sensor circuits, register data, etc (not shown). The servo logic system 18 is in communication with other components and sub-system of the servo control system 23.

Figure 2:
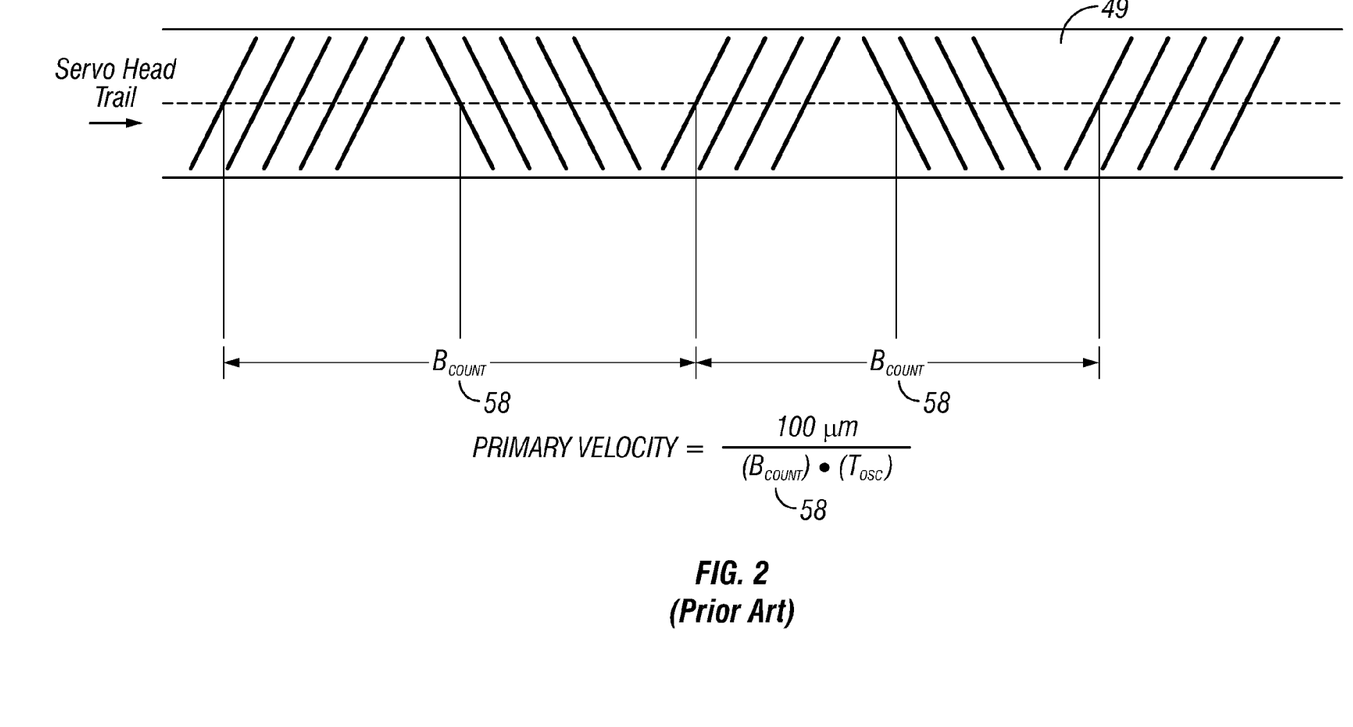
FIG. 2 is a detailed view of the servo track showing the $B_{count}$ and the formula that uses the $B_{count}$ to calculate primary velocity.

FIG. 1 shows that tape 48 is driven from supply reel 41 to take up reel 43. The supply reel 41 is driven by supply reel motor 40 while the take-up reel 43 is driven by take-up reel motor 42. Supply reel 41 and take-up reel 43 are rotated at appropriate, usually different, rotational velocities, such that the tape is moved from one tape reel, having one diameter of tape, to another tape reel having another diameter of tape, at the same longitudinal velocity. A read/write head 46 is located in the tape path between the reels and the reads the tape 48. A Hall sensor 28 senses the motor armature position from the motor 40, and the Hall sensor 38 senses the motor armature position from the motor 42. PWM motor driver 24 receives the sensed Hall signal 26 from the Hall sensor 28 while the PWM motor driver 30 receives the sensed Hall signal 36 from the Hall sensor 38. The sensed Hall signals 26, 36 from the Hall sensors 28 and 38 are also sent to the servo logic system 18. The PWM motor drivers 24 and 30 respectively drive the motors 40 and 42. The PWM motor drivers 24 and 30 communicate and send PWM signals 22, 34 to the servo logic system 18 while drivers 24 and 30 receive torque data 20 and 32, respectively, from servo logic system 18. The PWM motor driver 24 is coupled to reel motor 40 while another PWM motor driver 30 is coupled to a reel motor 42. A timing-based (TB) servo pattern detection system 44 receives the servo pattern signal from the servo track 49 (as shown in FIG. 2) of tape 48 via a servo read head in the read/write head 46. The TB servo pattern detection system 44 sends TB pattern signals 46 to the servo logic system 18.

With reference now FIGS. 1 and 2, the tape 48 is preformatted with longitudinally written servo track 49 for track following. The servo track 49 is written longitudinally along the entire length of tape 48 and is replicated transversely five times to create four servo regions or bands across the width of tape.

The primary or direct way of determining position and velocity of the tape 48 on the reels 41 and 43 involves using the pre-recorded servo track 49 on the tape 48. Each servo format track 49 is a sequence of flux transitions recorded in bursts separated by media without flux transitions. With reference to FIG. 2, the burst are a repeated pattern of 4, 4, 5, and 5 transitions. In one embodiment the separation between transitions within each burst is 5 um. In one embodiment, the spacing between the beginning of the two 4-transition burst to the beginning of the two 5-transition bursts, and likewise between the beginning of the two 5-transition bursts to the beginning of the two 4-transition bursts is 100 um. The spacing between 4-to-4 and 5-to-5 bursts varies with transverse position across the servo track. The spacing between 4-to 5 and 5-to-4 transitions is measured with a time period counter 19 which produces a value referred to as the B-count 58 in the servo system 23. This count varies only with the longitudinal tape velocity at the head 46, and in the formulation, it provides data to calculate the control signal for accurate velocity control during data transfer operation. The servo digital signal processor (DSP) 12 computes the tape velocity from the B-count 58 by the following relationship:

$$V_{primary} = \frac{100um}{B_{count} * T_{osc}}$$

where:

$V_{primary}$=primary tape velocity;

$B_{count}$=value of the B-counter; and $T_{osc}$=period of the clock for the B-counter While the primary velocity signal is very accurate and direct measure measurement of tape velocity, the primary velocity signal, and thus the primary velocity location information, is not always available for use in controlling the tape drive. In other words, the B-count 58 is only available for velocity control while the servo read head 46 is positioned over the servo track 49, and the tape velocity is within the dynamic range of the recording channel and the B-counter logic. Times exist when the head(s) 46 does/do not read the signals from the servo tracks 49, such as starting and stopping of the tape 48 and reels 41 and 43 or when the tape 48 and reels 41 and 43 are below some minimum velocity or above some maximum velocity. Accordingly, the primary velocity location information derived from the servo track 49 is unavailable during a large part of the acceleration and deceleration profile. In addition, the primary velocity location information is unavailable when the servo head(s) 46 is/are indexing laterally between the servo tracks 49, or servo bands. Very long drop-outs in the servo signal also make the total B-count value 58 unavailable for tape velocity control. Thus, an alternative method is needed to provide the tape velocity when the primary velocity location information is unavailable.

One example of an alternative method to provide the tape velocity is to utilize a secondary velocity. The term "secondary velocity" refers to an estimate of the tape velocity based on the back EMF voltage in DC motors 40 and 42 derived from the Pulse Width Modulated (PWM) signals. As is known to those of skill in the art, the back-EMF voltage can be computed by subtracting the estimated winding resistance ohmic voltage from the motor voltage. The winding resistance ohmic voltage is computed by multiplying the estimated motor current by the estimated winding resistance. The angular velocity of a DC motor is calculated by dividing the back EMF voltage of the motor by the motor voltage constant of the motor. The servo logic 18 computes an estimated longitudinal velocity of the tape 48 by multiplying the motor angular velocity by the radius of the tape at the reel the motor is driving. Commonly assigned U.S. Pat. Nos. 6,754,026 and 6,836,386 are incorporated for their showing of a servo control system that obtains tape velocity from a secondary velocity based on back EMF voltage.

The secondary velocity is typically always available, but does not have the accuracy of the primary velocity. For example, in the case of the back EMF measurement, the velocity signal includes error sources, such as motor voltage constant tolerances, winding resistance tolerances, and thermal effects, motor driver signal tolerances, and motor current estimation tolerances, among others.

Therefore, what is needed is a yet another alternative method, or a tertiary velocity, to provide the tape velocity when the primary velocity location information is unavailable, but which provides a more accurate tape velocity than the secondary velocity. The term "tertiary velocity", herein, refers to employing the Hall sensors to determine the actual angular velocity of the DC motors 40 and 42. Accordingly, the terms "Hall signal" and "tertiary velocity signal" are used interchangeably herein.

Figure 3A:
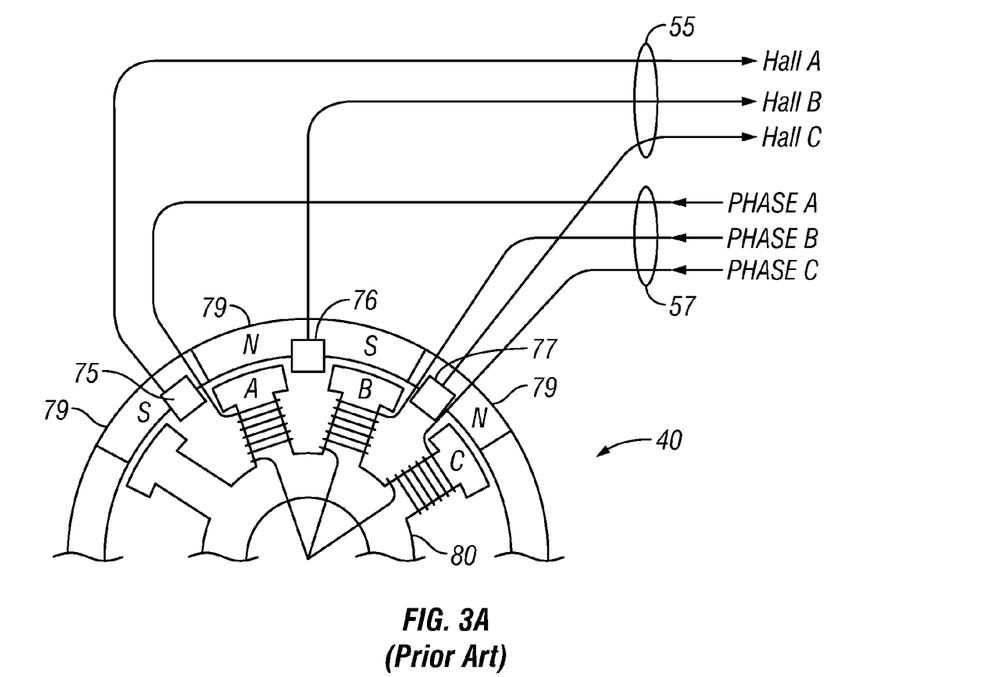
FIG. 3A is a schematic representation of an external rotor three phase brushless DC motor and three Hall sensors.

FIG. 3A represents a 3-phase external rotor brushless DC motor, such as DC motors 40 or 42, and three Hall sensors 75, 76, 77. As known to those of skill in the art, as the DC motor 40 is rotated, the Hall sensors proceed through a specific sequence of states or transitions, indicating feedback information about the DC motor rotor position as sensed from the rotor magnets 79. The feedback information (e.g. Hall signal (s)) is provided on the Hall sensor channels 55 to the PWM motor driver 24 or 30 of FIG. 1, which commutates the motor control signals on winding excitation lines 57 of FIG. 3A. The commutated drive signals drive windings on the stator 80, such that each control signal state (combination of drive signals on winding excitation lines 57) attracts the rotor magnets 79 to specific stable physical position corresponding to that state. For example, if control state "A" were asserted and the DC motor rotor position permitted to stabilize, the DC motor rotor would reach a corresponding position. "A".

Figure 3B:
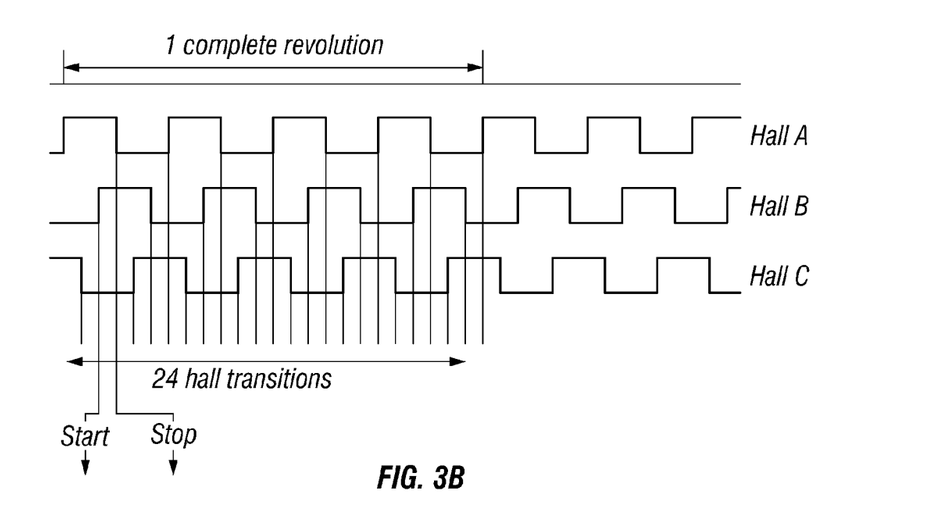
FIG. 3B is a diagrammatic illustration of Hall sensor signals for motion of the DC motor of FIG. 3A.

The Hall sensors 75, 76, 77 are aligned so that the sensor signals change state or transition precisely at the stable rotor position. During one full rotation of the DC motor 40, the sequence of transitions is repeated N times, where the number of magnetic poles of the rotor is N. The total number of Hall transitions for one full rotation of a 3 phase brushless DC motor with 8 magnetic poles in the rotor is therefore 24. FIG. 3B comprises an exemplary embodiment showing the Hall signals and Hall transitions measured and provided on the Hall sensor channels 55 (e.g. Hall A, Hall B, and Hall C) from each of the Hall sensors 75, 76, 77 during one complete revolution of the DC motor (e.g. 40 or 42). In an alternative embodiment that is not shown, the tape drive 10 may have 16 magnetic poles in the rotor (e.g. linear tape open (LTO) half-high drive) such that the total number of Hall states for one full rotation of a 3 phase brushless DC motor is 48.

As described above the Hall signals provide feedback information about the DC motor rotor position as sensed from the rotor magnets. The DC motor rotor position information in combination with information from the counter 19 about time elapsed between Hall transitions is utilized to determine a tertiary tape velocity. The equation for the determining the tertiary tape velocity at the tape reel is:

$$V_{tertiary} = \omega * R$$

where:
$V_{tertiary}$=tertiary tape velocity;
ω=angular velocity of the reel; and
R=reel radius at the time of the sample
The angular velocity can be determined by the following equation:

$$\omega = \frac{2\pi}{H_{trans} \times \text{time}}$$

where:
$H_{trans}$=the number of Hall transitions detected
As discussed above, in one embodiment, the total number of Hall transitions for one full rotation of a 3 phase brushless DC motor with 8 magnetic poles in the rotor is 24 such that the equation becomes:

$$\omega = \frac{2\pi}{24 * \text{time}}$$

where:

$$\text{time} = \frac{\text{count}}{\text{clock}}$$

The count is the number of counts between each of the 24 Hall transitions and the clock is the sample rate of the clock in the above equations. As shown in FIG. 3B, the counter 19 in servo logic 18 begins the count at the end of one Hall transition and ends the count at the beginning of next Hall transition.

As discussed above, while the primary velocity signal is very accurate and a direct measure measurement of tape velocity, the primary velocity signal, and thus the primary velocity location information, is not always available for use in controlling the tape drive especially at slower velocities. While the secondary velocity is typically available at any DC motor angular velocity, it is subject to errors, and thus it does not have the accuracy required to control the velocity of the tape reels. The tertiary velocity is a more accurate measurement than the secondary velocity however, the tertiary velocity is not available or is inaccurate at very slow tape velocities (e.g. a longitudinal tape velocity slower than about 1.0 m/s). For example, the tertiary velocity may not be available when the tape is beginning from rest or during acceleration and deceleration of the tape reels 41, 43. As discussed above, the tertiary velocity calculation utilizes Hall sensors to determine the position of the DC motors 40 and 42 and utilizes a clock and a counter to determine the time elapsed as the DC motors 40 and 42 move from one position to another. Accordingly, the tertiary velocity calculation is constrained by the clock speed and the resolution of counter 19.

Specifically, a counter 19 is limited by its ability to store data such as the number of counts. In one embodiment, if counter 19 is an 8 bit counter it may be capable of storing 256 counts. In an embodiment in which the DC motor 40 is moving at slower angular velocities the counter 19 may reach its storage limit of counts before the next Hall transition is reached. Thus, if the number of counts stored were used in the tertiary velocity calculation the resulting calculated velocity would be inaccurate.

Furthermore, the servo system 18 requests regular updates of the tape velocity. Herein these requests are referred to as interrupts. In one embodiment these interrupts may be performed every 800 microseconds. If the DC motor 40 is moving so slowly such that a Hall transition is not sensed during the time between interrupts (e.g. 800 microseconds), the servo system 18 is unable to calculate the tertiary velocity.

Therefore, an embodiment in which three different velocities, namely, primary, secondary, and tertiary, are utilized to operate a magnetic tape drive is described in herein in accordance with one embodiment of the invention.

Figure 4:
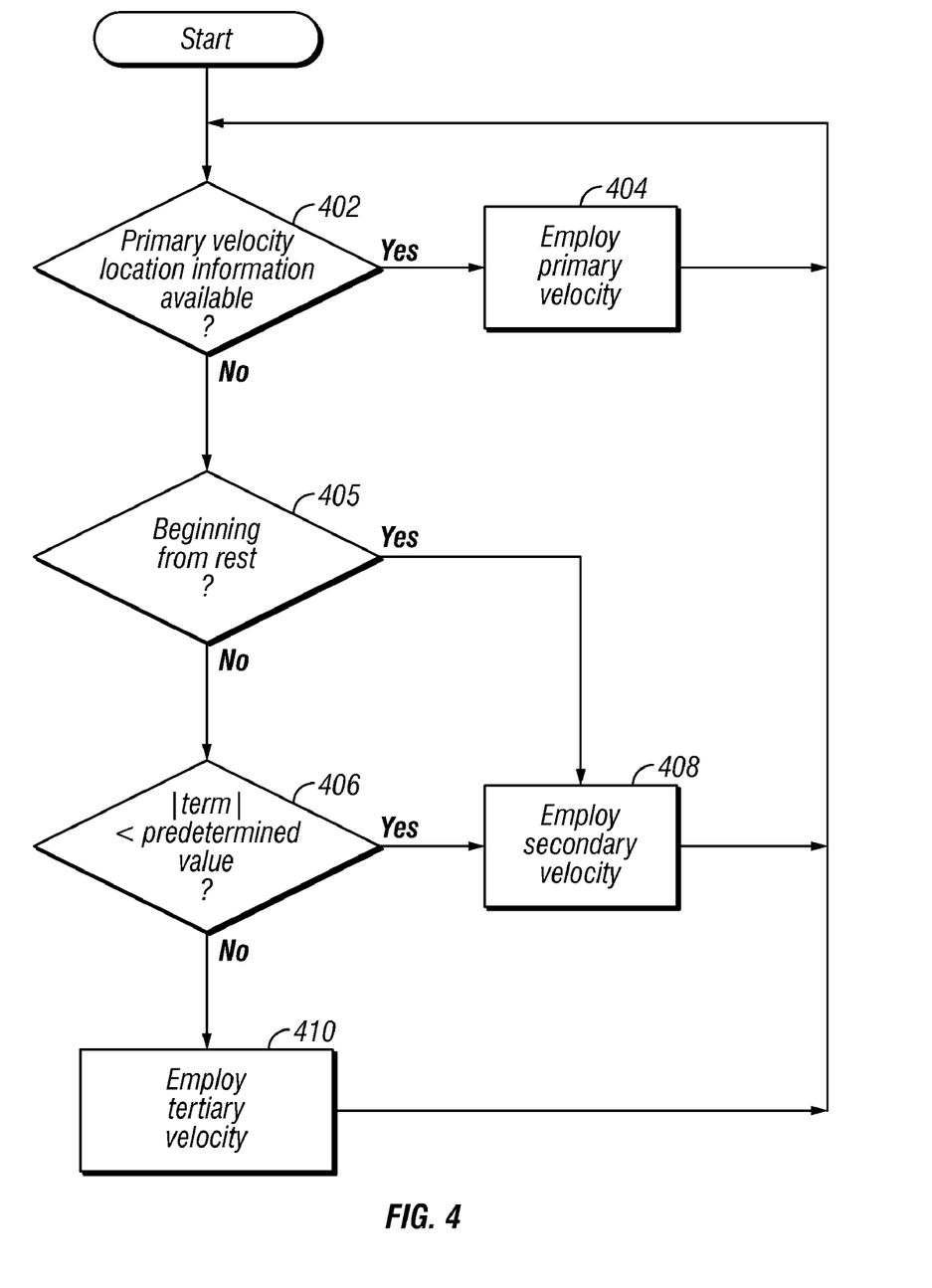
FIG. 4. is a flow chart depicting an embodiment of the method of the present invention of utilizing a three state velocity control.

Referring to FIG. 4, during the operation of a tape drive the servo logic 18 will initiate an interrupt to determine the tape velocity. As discussed above, in one embodiment, the interrupt may be performed every 800 microseconds. One or ordinary skill in the art would understand that the frequency of the interrupts may be user defined and/or vary based on the level of tape velocity control required. In response to the interrupt, in step 402 the servo logic 18 detects if primary velocity location information is available. In step 404, in response to detecting that primary velocity location information is available the primary velocity is employed to control the tape velocity in the tape drive 10. As discussed above, the primary velocity is computed by the servo digital signal processor (DSP) 12 from the B-count 58. The process flows back to step 402 when the next interrupt is received.

If however in step 402, the servo logic 18 detects that the primary velocity location information is unavailable the process flows to step 405. In step 405, the servo logic determines if the DC motors 40, 42 are beginning from a rest. In response to determining that the DC motors 40, 42 are beginning from a rest the process flows to step 408. Alternatively, if it is determined that the DC motors are not beginning from a rest the process flows to step 406.

In step 406, the servo logic 18 detects if the absolute value of a term related to tape velocity is less than a predetermined value. In one embodiment the term is directly related to a rotational velocity of one of the DC motors 40, 42. As discussed above, the supply 41 and take-up reel 43 may be rotated at different rotational velocities based on the diameter of the tape such that an equal longitudinal tape velocity is maintained. Further, as explained above, the tertiary velocity is constrained by the clock speed and the resolution of counter 19 such that at very slow tape velocities an accurate Hall signal is unavailable, and therefore, the tertiary velocity is unavailable or inaccurate. One of ordinary skill in the art would understand the tape reel with the largest diameter of tape will move at the slowest angular velocity such that the DC motor operating the reel will also move at the slowest angular velocity. Accordingly, to ensure that an accurate tertiary velocity is available, the determination in step 406 of which velocity (secondary or tertiary) is employed will be based on the tape reel 41, 43 with the largest tape diameter, and thus, the DC motor with the slowest angular velocity.

In one embodiment, the predetermined value is the longitudinal tape velocity. In another embodiment, the predetermined value is a longitudinal tape velocity of about 1.0 m/s. One of ordinary skill in the art would recognize that this predetermined value is based on the data storage and resolution limitations of currently employed counters as well as other factors. In one embodiment, this velocity is directly related to the angular velocity of the DC motor that is rotating at the slowest rate. One of ordinary skill in the art would understand that the predetermined value of the term related to tape velocity may be lower than 1.0 m/s as the data storage and resolution capabilities of the counter 19 increased. For example, if a 16 bit counter were utilized the number of counts available to store would be higher than that of an 8 bit counter. Accordingly, in this embodiment, the DC motors 40 and 42 could operate at angular velocities that translate to a longitudinal velocity below 1.0 m/s while still allowing for an accurate Hall signal available for determining the longitudinal tape velocity.

In another embodiment, the DC motor 40 may have more than 8 magnetic poles in the rotor allowing for greater counter resolution. For example, in the case of the linear tape open (LTO) half-high drive the DC motor 40 has 16 magnetic poles in the rotor such that the total number of Hall states for one full rotation of a 3 phase brushless DC motor is 48. Therefore, more Hall transitions are available for sensing during a full rotation of the motor. Accordingly, in this embodiment, the DC motors 40 and 42 could operate at angular velocities that translate to a longitudinal velocity below 1.0 m/s while still allowing for an accurate Hall signal available for determining the longitudinal tape velocity.

Similarly, one of ordinary skill in the art would understand that if data storage and resolution capabilities of the counter 19 were decreased the predetermined value of the term related to tape velocity would be higher than that of 1.0 m/s.

Returning to FIG. 4, in response to determining that the DC motors 40, 42 are beginning from a rest or in response to detecting that the absolute value of a term related to tape velocity is less than a predetermined value, the process flows to step 408. In step 408 the secondary velocity signal is employed to control the tape velocity in the tape drive 10. As described above, servo logic 18 computes an estimated longitudinal velocity of the tape 48 utilizing the secondary velocity signal. The process flows back to step 402 when the next interrupt is received.

If however, the servo logic 18 detects that if the absolute value of a term related to tape velocity is greater than a predetermined value then the process flows to step 410. In step 410, the tertiary velocity signal is employed to control the tape velocity in the tape drive 10. As described above, servo logic 18 computes an estimated longitudinal velocity of the tape 48 utilizing the tertiary velocity signal. The process flows back to step 402 when the next interrupt is received. The process flow of FIG. 4 is repeated at each interrupt while operating tape drive 10.

Thus, a magnetic tape drive, a servo system, and a method for operating a magnetic tape drive that utilizes primary, secondary, and tertiary velocity measurements to precisely control the tape longitudinal velocity are provided.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), digital versatile disk (DVD), Blu-Ray Disk (BD), an optical storage device including a holographic device, a magnetic storage device, a nanoprobe millipede device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method of operating a magnetic tape drive, said magnetic tape drive having a plurality of DC motors, each DC motor having a plurality of Hall sensors, said DC motors each arranged to longitudinally move a magnetic tape mounted on tape reels rotated by said DC motors under the control of a servo system, said servo system configured to read location information from said magnetic tape, to compute a primary tape velocity from said location information, to sense a secondary velocity signal based on a back-EMF voltage of at least one of said DC motors, and a tertiary velocity signal based on a signal of at least one of said Hall sensors and compute a tape velocity based on one of the sensed secondary velocity signal and tertiary velocity signal the method comprising:

detecting if said primary velocity location information is available;

employing said primary velocity to control said servo system in response to detecting that said primary velocity location information is available; and     employing one of said secondary velocity signal and said tertiary velocity signal to control said servo system in response to detecting said primary velocity location information is unavailable and wherein said secondary velocity signal is employed when an absolute value of a term related to tape velocity is less than a predetermined value and said tertiary velocity signal is employed when an absolute value of said term related to tape velocity is greater than said predetermined value.

2. The method of claim 1, wherein said secondary and said tertiary velocity signals are measured from at least one of said DC motors, and wherein said predetermined value of said term related to tape velocity is directly related to a rotational velocity of at least one said DC motor.

3. The method of claim 1, wherein said primary velocity location information comprises a formatted servo track on said magnetic tape.

4. The method of claim 1, wherein said term comprises a rotational velocity of one of said DC motors that are rotating at a slowest rate.

5. The method of claim 4, wherein said secondary velocity signal is employed when the DC motors are beginning from rest.

6. A magnetic tape drive for reading and/or writing data with respect to magnetic tape comprising:

at least one read/write head positioned at a tape path for reading and/or writing data with respect to a magnetic tape in said tape path;

a plurality of DC motors, whereby tape reels mounted for rotation by said plurality of DC motors provide said magnetic tape to move longitudinally from one said tape reel to another said tape reel along said tape path;

at least one Hall sensor at each of said DC motors for sensing rotational states of said DC motors;

a servo system, said servo system configured to read location information from the magnetic tape, to compute a primary tape velocity from said location information, to sense a secondary velocity signal based on a back-EMF voltage of at least one of said DC motors, and a tertiary velocity signal based on a signal of said at least one Hall sensor and compute a tape velocity based on one of the sensed secondary velocity signal and tertiary velocity signal; and     logic for operating said servo system and detecting said Hall sensors, said logic:

detecting if said primary velocity location information is available;

employing said primary velocity to control said servo system in response to detecting that said primary velocity location information is available; and employing one of said secondary velocity signal and said tertiary velocity signal to control said servo system in response to detecting said primary velocity location information is unavailable and wherein said secondary velocity signal is employed when an absolute value of a term related to tape velocity is less than a predetermined value and said tertiary velocity signal is employed when an absolute value of said term related to tape velocity is greater than said predetermined value.

7. The magnetic tape drive of claim 6, wherein said secondary and said tertiary velocity signals are measured from at least one of said DC motors, and wherein said predetermined value of said term related to tape velocity is directly related to a rotational velocity of at least one said DC motor.

8. The magnetic tape drive of claim 6, wherein said primary velocity location information comprises a formatted servo track on said magnetic tape.

9. The magnetic tape drive of claim 6, wherein said term comprises a rotational velocity of one of said DC motors that are rotating at a slowest rate.

10. The magnetic tape drive of claim 9, wherein said secondary velocity signal is employed when the DC motors are beginning from rest.

11. A servo control system for a magnetic tape drive for reading and/or writing data with respect to magnetic tape, said magnetic tape drive having a plurality of DC motors, each DC motor having a plurality of Hall sensors, said DC motors each arranged to longitudinally move a magnetic tape mounted on tape reels rotated by said DC motors under the control of said servo system, said servo system configured to:

read location information from said magnetic tape to compute a primary tape velocity from said location information;

sense a secondary velocity signal based on a back-EMF voltage of at least one of said DC motors, and a tertiary velocity signal based on a signal of at least one of said plurality of Hall sensors and compute a tape velocity based on one of the sensed secondary velocity signal and tertiary velocity signal;

detect if said primary velocity location information is available;

employ said primary velocity to control said servo system in response to detecting said primary velocity location information is available; and employ one of said secondary velocity signal and said tertiary velocity signal to control said servo system in response to detecting said primary velocity location information is unavailable, wherein said secondary velocity signal is employed when an absolute value of a term related to tape velocity is less than a predetermined value and said tertiary velocity signal is employed when an absolute value of said term related to tape velocity is greater than said predetermined value.

12. The servo control system of claim 11, wherein said secondary velocity signal and said tertiary velocity signal are measured from at least one of said DC motors, and wherein said predetermined value of said term related to tape velocity is directly related to a rotational velocity of at least one said DC motor.

13. The servo control system of claim 11, wherein said primary velocity location information comprises a formatted servo track on said magnetic tape.

14. The servo control system of claim 11, wherein said term comprises a rotational velocity of one of said DC motors that are rotating at a slowest rate.

15. The servo control system of claim 14, wherein said secondary velocity signal is employed when the DC motors are beginning from rest.

\* \* \* \* \*